United States Patent [19]
Rasmussen
[11] Patent Number: 4,619,404
[45] Date of Patent: Oct. 28, 1986

[54] GAS DISTRIBUTION ARRANGEMENT FOR THE ADMISSION OF A PROCESSING GAS TO AN ATOMIZING CHAMBER

[75] Inventor: Henning Rasmussen, Hovedgaden, Regstrup, Denmark

[73] Assignee: APY Anhydro A/S, Soborg, Denmark

[21] Appl. No.: 705,548

[22] Filed: Feb. 26, 1985

[30] Foreign Application Priority Data

Feb. 28, 1984 [DK] Denmark ............................ 1217/84

[51] Int. Cl.[4] .............................................. B01D 47/16
[52] U.S. Cl. .................................... 239/461; 239/424; 239/590.5; 239/593; 261/79 A; 261/88
[58] Field of Search ..................... 239/461, 590, 590.3, 239/590.5, 399, 424, 592, 593; 159/4.01; 261/79 A, 88

[56] References Cited

U.S. PATENT DOCUMENTS 3,381,713 5/1968 Jacobsen ......................... 415/216 X
4,226,603 10/1980 Larsson et al. .................. 261/88 X
4,227,896 10/1980 Larsson et al. .................. 261/88 X
4,571,311 4/1986 Ferguson, Jr. et al. ....... 261/79 A X

FOREIGN PATENT DOCUMENTS 141671 10/1980 Denmark .
141793 11/1980 Denmark .
0008524 3/1980 European Pat. Off. .
1255231 1/1961 France .
1289817 2/1962 France .

*Primary Examiner*—Joseph F. Peters, Jr.
*Assistant Examiner*—Mary Beth O. Jones
*Attorney, Agent, or Firm*—Brumbaugh, Graves, Donohue & Raymond

[57] ABSTRACT

In a gas distribution arrangement the processing gas is admitted from a helical inlet duct through an annular orificial slit into a space between two coaxial guide walls. Guide vanes are provided in the orificial slit to impart a change of direction to the flow of processing gas. Each guide vane is a spatial body with differently extending, vertical limitation surfaces, which between adjacent vanes delimit ducts whose sectional area as measured transversely of the flow direction of the processing gas through the individual duct is substantially of the same size over the extent of the duct. The vertical height of the guide vanes may decrease along their radial extent inwards in the orificial slit, and their vertical limitation surfaces may form an acute angle at the radially innermost ends of the guide vanes.

3 Claims, 3 Drawing Figures

GAS DISTRIBUTION ARRANGEMENT FOR THE ADMISSION OF A PROCESSING GAS TO AN ATOMIZING CHAMBER

BACKGROUND OF THE INVENTION

The present invention relates to a gas distribution arrangement for the admission of a processing gas to an atomizing zone around an atomizing device coaxially arranged in an atomizing chamber, the processing gas being admitted from a horizontal, helical inlet duct through an annular orificial slit, which is in rotational symmetry with the axis of the chamber, into a space between two coaxial guide walls around and above the atomizing device, said orificial slit being provided with guide vanes to impart to the flow of processing gas a change of direction from a substantially exclusively tangential flow in the helical duct to a predominantly radial flow into the space between the coaxial guide walls.

A gas distribution arrangement of this nature is known from the specification pertaining to U.S. Pat. No. 4,227,896 to Larsson et al., corresponding to Danish Pat. No. 141,671, and as in the case of the invention dealt with therein the term atomizing chamber should also in connection with the present invention be understood as a treatment chamber for various processes, such as drying, cooling, and absorption, wherein a liquid, which may be a pure substance, a solution or a suspension, is atomized by means of an atomizing device, such as a rotating atomizing wheel, which is coaxially disposed in the normally substantially cylindrical atomizing chamber.

Furthermore, from the specification pertaining to U.S. Pat. No. 4,226,603 to Larsson et al., corresponding to Danish Pat. No. 141,793 another gas distribution arrangement of the nature referred to in the introduction is known, comprising two separate sets of guide vanes disposed in the orificial slit one above the other.

The objects of the former of these known gas distribution arrangements are to obtain at the internal aperture of the orificial slit facing the conical guide duct an optimal and in respect to rotational symmetry uniform distribution of the processing gas admitted in the helical duct, and with a substantially reduced pressure drop over the orificial slit, and furthermore already at this place a definite piloting of the flow of gas into a downward spiral path with a comparatively low rotation component in the conical guide duct, and these objects are obtained by having the guide vanes comprise two radially succeeding sets of fixed, plate-shaped guide vanes, of which the radially outer set of vanes deflects the flow of gas into having a predominantly radial velocity component, whereas each vane in the inner set of vanes protrudes into the space between the innermost parts of adjacent vanes in the outer set of vanes and extends substantially parallel with the innermost tangential planes of same.

However, by this arrangement it cannot be avoided that in the course of the flow of gas from the outer set of plate-shaped guide vanes into the spaces between the inner set of plate-shaped guide vanes, eddies involving losses and also sudden changes of velocity will occur owing to abrupt changes of direction and of cross sections of the flow, resulting in a pressure drop and an increased power consumption for supplying the processing gas.

SUMMARY OF THE INVENTION

The present invention has for its object to provide a gas distribution arrangement of the nature referred to in the introduction, by which these disadvantages are avoided to a large extent, so that the pressure drop over the orificial slit and the power consumption for supplying the processing gas are reduced to a minimum.

This is achieved according to the invention by forming each guide vane as a spatial body with differently extending, evenly curved, vertical limitation surfaces, which between adjacent vanes delimit ducts whose sectional area as measured transversely of the flow direction of the processing gas through the individual duct is substantially of the same size over the extent of the duct.

By this arrangement a substantially uniform velocity of the processing gas during its flow through the said ducts is obtained, and it is also avoided that eddies are produced as a consequence of a sudden enlargement of the sectional area of the duct and abrupt changes of the direction of the walls of the duct, and that pressure variations occur in consequence. The aggregate effect of this arrangement is a minimal pressure drop over the orificial slit with the guide vanes, and consequently a minimal power consumption for supplying the processing gas.

The vertical limitation surfaces of the guide vanes are preferably formed of plate elements bent into shape. By this means it is possible to apply comparatively unchanged the technology based on plate work, which has so far been used for the production of such gas distribution arrangements.

It is preferred that the vertical height of the guide vanes decreases along their radial extent inwards in the orificial slit, and that their vertical limitation surfaces meet at an acute angle, at any rate at the radially innermost ends of the guide vanes, seeing that by this arrangement there is obtained a gradual deflection of the direction of the flow of processing gas downwards in the space between the conical guide walls, which also contributes towards diminishing the power consumption for supplying the processing gas.

BRIEF DESCRIPTION OF THE DRAWINGS

The invention will now be described in more detail, reference being had to the purely schematical drawing, wherein.

DETAILED DESCRIPTION OF THE PREFERRED EMBODIMENT

Figure 1:
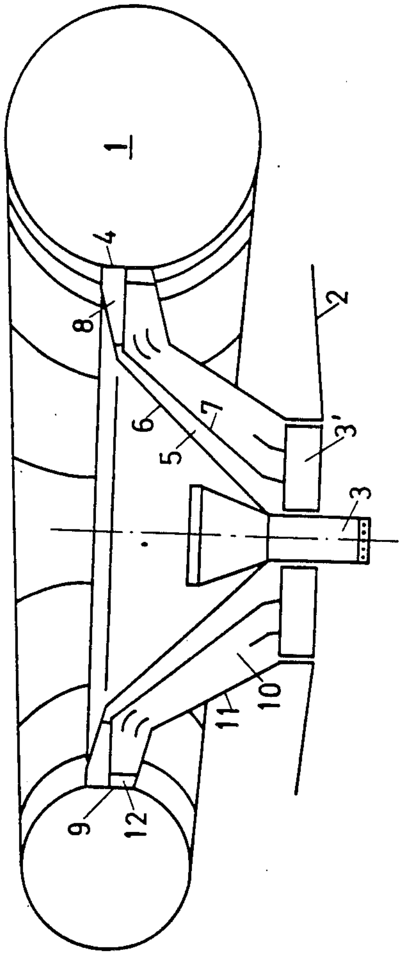
FIG. 1 shows a vertical section through a gas distribution arrangement according to the invention.
Figure 2:
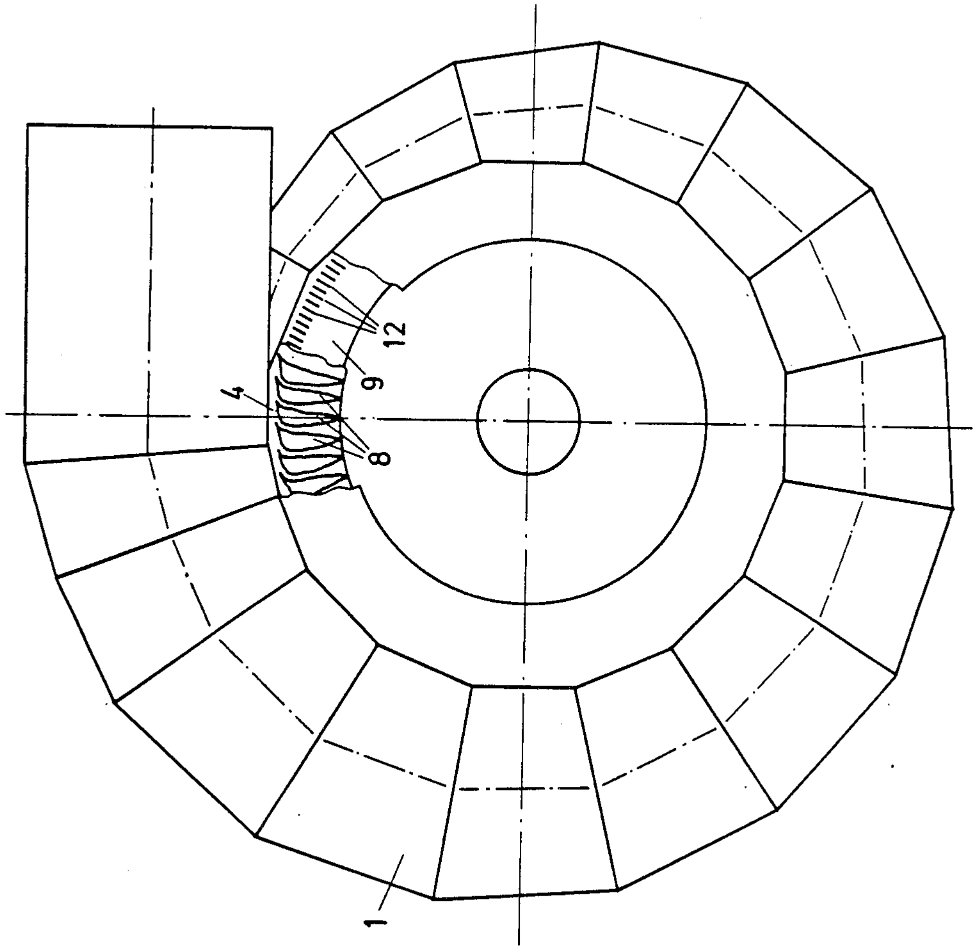
FIG. 2 is the gas distribution arrangement shown in FIG. 1 as seen from above, certain portions having been removed to show the placing of the guide vanes.

FIGS. 1 and 2 show a vertical section through a gas distribution arrangement according to the invention, and the arrangement as seen from above, respectively. The gas distribution arrangement consists of a helical inlet duct 1 for processing gas, placed above an atomizing chamber, the ceiling of which is indicated in FIG. 1 by the numeral 2, and wherein there is coaxially disposed a centrifugal atomizer 3. From the inlet duct 1 an orificial slit 4, which is in rotational symmetry with the axis of the atomizing chamber, leads into a space 5 between two conical guide walls 6 and 7, the space 5 opening around and above the atomizer 3. A number of guide vanes 8 are uniformly distributed in the annular orificial slit 4.

Below the orificial slit 4 there is provided another annular slit 9, which from the inlet duct 1 leads into another space 10 between the conical guide wall 7 and an additional conical guide wall 11, the space 10 around the space 5 opening around and above the atomizer 3. Common to the spaces 5 and 10, guide vanes 3' may be disposed around the atomizer 3. A number of plate-shaped guide vanes 12 are uniformly distributed in the annular slit 9.

The annular slit 9 with the guide vanes 12 and the space 10 constitutes no part of the present invention and serves to direct an outer flow of processing gas to the atomizing zone around the atomizer 3.

Figure 3:
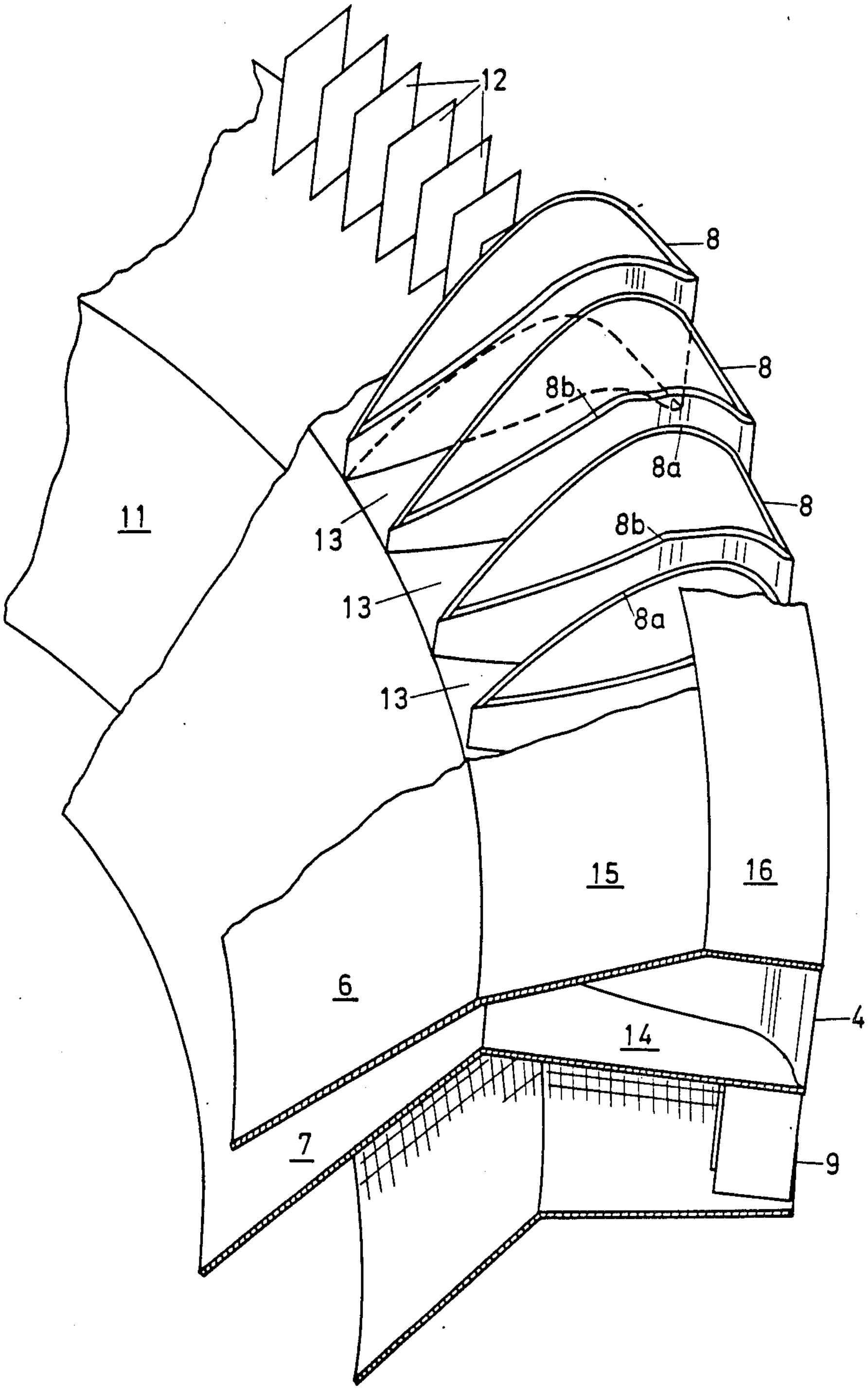
FIG. 3 shows on an enlarged scale and in perspective and with some parts removed a segment of an orificial slit with guide vanes in a gas distribution arrangement according to the invention.

As will be more clearly seen from FIG. 3, the guide vanes 8 are spatial bodies, their vertical limitation surfaces 8*a* and 8*b* between adjacent guide vanes 8 being continuously curved and delimiting ducts 13. The shape of the limitation surfaces 8*a* and 8*b* of the guide vanes 8 is so chosen that the sectional area of each of the ducts 13, as measured transversely of the direction of flow of the processing gas through the duct, is substantially of the same size over the whole extent of the duct 13. As appears from FIG. 3 the height of the guide vanes 8 decreases along their radial extent inwards in the orificial slit 4, which has been shown as delimited between a lower plate 14 and two upper plates 15 and 16, and the vertical limitation surfaces 8*a* and 8*b* of each guide vane 8 meet at an acute angle at the radially innermost end of the vane.

By this arrangement it is obtained that the velocity of the processing gas during its passage through each of the ducts 13 remains substantially unchanged, and that at the same time there is imparted to it a downward direction into the space between the conical guide walls 6 and 7.

The guide vanes 8 may be formed as solid bodies, but it is preferred that each of the vertical limitation surfaces 8*a* and 8*b* are formed of plate elements bent into shape, which e.g. by welding are attached to the lower plate 14 in the orificial slit 4.

I claim:

1. A gas distribution arrangement for the admission of a processing gas to an atomizing zone around an atomizing device coaxially arranged in an atomizing chamber, the processing gas being supplied to a helical inlet duct and admitted from an orificial slit in said helical duct, which is in rotational symmetry with the axis of the chamber, into a space between two coaxial guide walls around and above the atomizing device, said orificial slit being provided with guide vanes to impart to the flow of processing gas a change of direction from a substantially exclusively tangential flow in the helical duct to a predominantly radial flow into the space between the coaxial guide walls, wherein each guide vane is a spatial body with differently extending, continuously curved, vertical limitation surfaces, which between adjacent guide vanes delimit ducts whose sectional area as measured transversely of the flow direction of the processing gas through the individual duct is substantially the same size over the extent of the duct.

2. A gas distribution arrangement according to claim 1, wherein the vertical limitation surfaces of the guide vanes are formed of plate elements bent into shape.

3. A gas distribution arrangement according to claim 1, wherein the vertical height of the guide vanes decreases along their radial extent inwards in the orificial slit, and their vertical limitation surfaces meet at an acute angle at the radially innermost ends of the guide vanes.

* * * * *

UNITED STATES PATENT AND TRADEMARK OFFICE

CERTIFICATE OF CORRECTION

PATENT NO. : 4,619,404

DATED : October 28, 1986

INVENTOR(S) : Henning Rasmussen

It is certified that error appears in the above-identified patent and that said Letters Patent is hereby corrected as shown below:

First Page, Item 73, "APY Anhydro" should read --APV Anhydro--.

Signed and Sealed this

Twenty-eighth Day of April, 1987

*Attest:*

DONALD J. QUIGG

*Attesting Officer* *Commissioner of Patents and Trademarks*